Aug. 14, 1928.
W. H. SAUVAGE
1,681,055
REGULATOR FOR BRAKE RIGGING
Filed Nov. 1, 1927   2 Sheets-Sheet 1
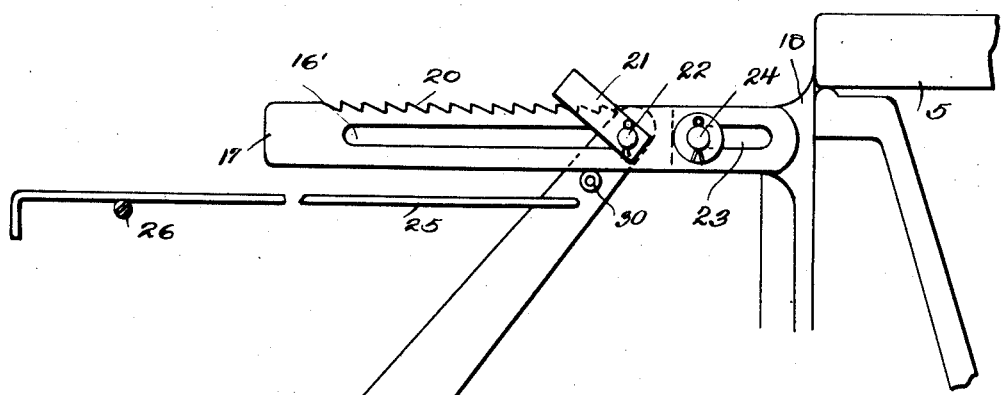
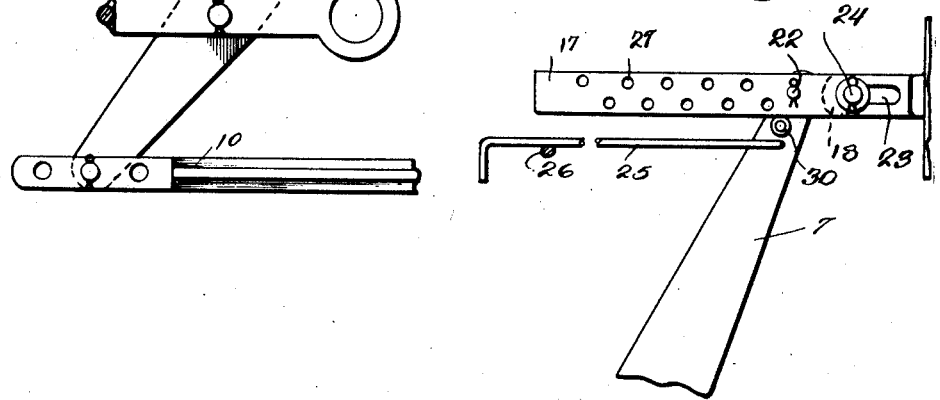
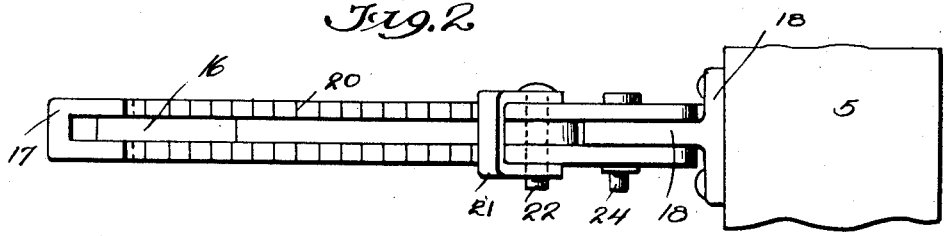
INVENTOR.
William H. Sauvage
BY
ATTORNEY.

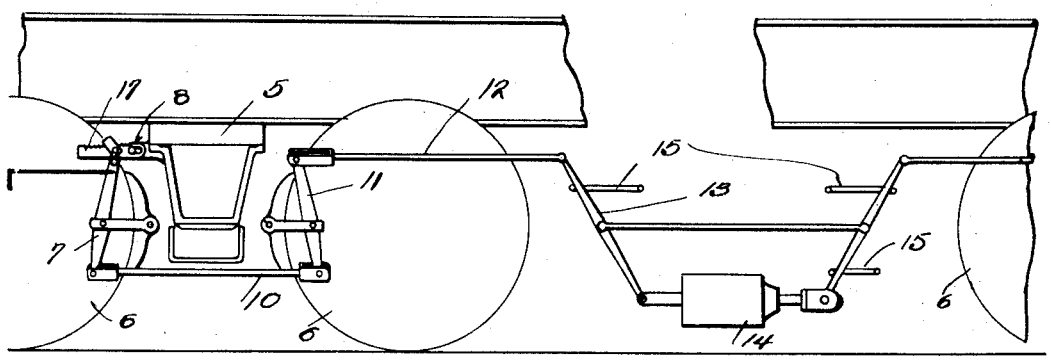
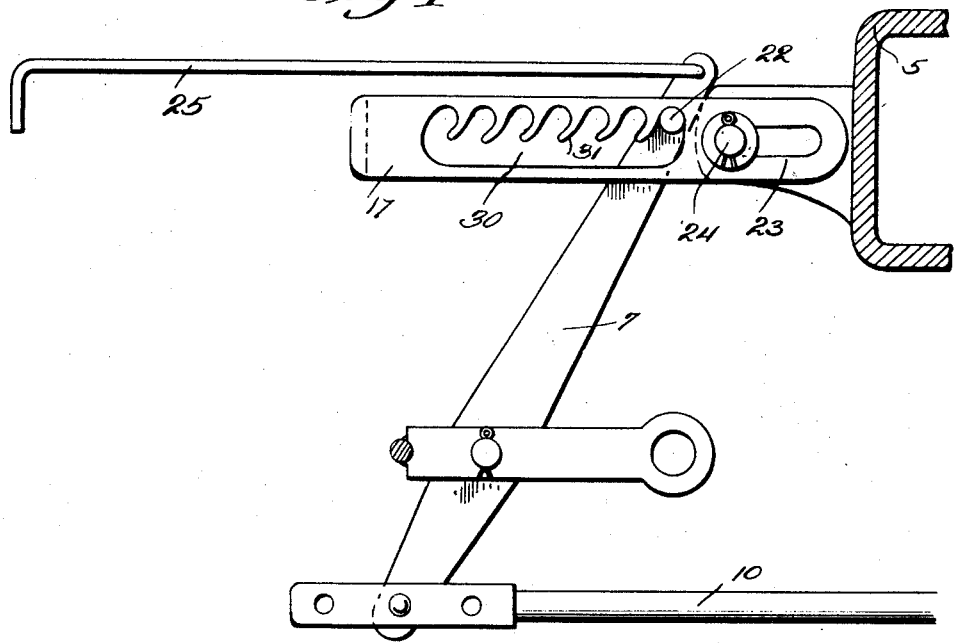
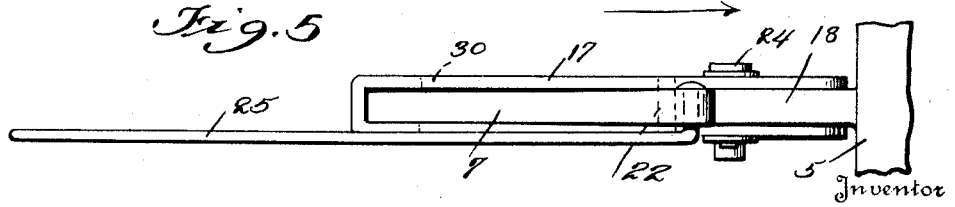

Patented Aug. 14, 1928.

1,681,055

UNITED STATES PATENT OFFICE.

WILLIAM H. SAUVAGE, OF NEW YORK, N. Y., ASSIGNOR, BY MESNE ASSIGNMENTS, TO ROYAL RAILWAY IMPROVEMENTS CORPORATION, OF NEW YORK, N. Y., A CORPORATION OF DELAWARE.

REGULATOR FOR BRAKE RIGGING.

Application filed November 1, 1927. Serial No. 230,347.

This invention relates to improvements in regulators for brake rigging and more particularly to a manually actuated regulator peculiarly adapted for association with the supported end of the dead lever of the truck brake rigging. It will be understood, however, that without material modification the structure is equally applicable to other parts of the brake rigging where an adjustment of a relatively fixed part is desired.

It has long been customary in devices of this general nature to support the upper end of the dead lever of the brake rigging in an adjustable manner. This adjustable supporting feature has been accompanied by various objections due primarily to the inability of accurately adjusting the lever and brake shoes carried thereby properly with respect to the peripheries of the wheels engaged by the brake shoes. Also there has been considerable difficulty experienced in regulating the levers at one end of the car without disturbing the angularity of the levers at the opposite end of the car.

Accordingly, the present invention has for one of its main objects the provision of a simple and practical manually actuated means for properly, easily and quickly positioning the levers with due regard to brake shoe clearance.

A further object is to provide a mechanism of the above general character having relatively few parts which may be inexpensively manufactured and assembled, and which is capable of ready installation on brake equipment now in general use without needless substitution, waste of parts, and like objections.

A further object is to provide a reliable and quick acting regulator adapted to be associated with the cylinder levers of a foundation brake gear whereby the same may be quickly regulated to obtain proper brake shoe clearance and predetermined piston travel.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings, like characters of reference denote corresponding parts throughout all of the views, in which—

Fig. 1 is a diagrammatic elevation, partly in section, of such parts of the truck brake rigging and regulator as is necessary to understand the invention;

Fig. 2 is a plan view of the parts shown in Fig. 1;

Fig. 3 is a view similar to Fig. 1 showing a modified form of regulator and associated rigging;

Fig. 4 is a view similar to Fig. 1, illustrating a further modification;

Fig. 5 is a plan view of the parts shown in Fig. 4; and

Fig. 6 is a diagrammatic view of the truck brake rigging and associated parts.

Referring now to the drawings, and with particular reference to Fig. 6, the numeral 5 indicates a truck bolster having truck wheels 6 associated therewith. Between the wheels as herein shown are two brake levers, of which the dead lever 7 is adjustably supported at 8 from the truck bolster and has its lower end connected by means of a bottom rod 10 to the lower end of a live lever 11. The upper end of the live lever is connected by means of a pull rod 12 with one end of a cylinder lever 13, the other end of which is directly associated with the air brake cylinder 14. It will be noted particularly that this lever 13 is supported in a hanger such as a slotted sill support or car bracket 15 or other suitable means depending from the usual car sill, whereby the lever is guided and the movement of the said lever is limited in one direction for a purpose which will be apparent from the following description.

It may be stated that this hanger or lever guide mechanism forms no part of the present invention except in so far as it necessarily enters into certain combinations hereinafter set forth, the same being more fully described and explained in my prior Patent, No. 1,612,781, dated December 28, 1926.

Referring to Fig. 1, the upper end of the dead lever 7 is fulcrumed in a longitudinal guide slot 16 formed in a fulcrum hanger 17 pivotally secured to a lug 18 formed integrally with or carried at one side of the bolster 5. The hanger 17 is provided with ratchet teeth 20 on its upper surface, which are adapted to be engaged by a pawl 21 straddling hanger 17 and secured to the upper end of the lever 7 by means of a pin 22 extending thru a horizontally arranged slot 16' in said hanger 17. The legs of the hanger are provided with a slot 23, thru which extends a pin 24 which passes thru a hole in lug 18. The said hanger is thus pivotally secured to the lug 18 and is permitted a free movement relative thereto in accordance with the length of slot 23 prior to a regulating take up movement. A handle or operating rod 25 secured to the lever 7 extends towards the end of the car and is supported in any desired manner, such for example, as indicated by a transverse rod support 26.

When the actuating rod 25 is pulled forcibly towards the left, it will carry with it the hanger 17 the length of the slot 23, which is designed to be proportional to normal brake shoe clearance permitted all of the brake shoes. Thus when the right end of the slot 23 is engaged by pin 24, the brake shoes should be in engagement with the wheel surfaces. If, however, any excess movement occurs by reason of wear of the brake shoes, the pawl 21 engages with and slips over one or more teeth of the ratchet 20 as may be necessary actually to take up this excess travel. When the rod 25 is released or is moved its full distance towards the right, the hanger 17 moves back to the position shown in Fig. 1 and the brake shoes are at a predetermined distance from the peripheral surfaces of the several wheels. Even if this rod 25 is not forcibly or manually moved to restore the parts to the position shown in Fig. 1, the first application of the brakes will restore the hanger 17 to normal position inasmuch as the application of the brakes causes a tendency of the said hanger to move in that direction.

At this point, the importance of the lever guide brackets or hanger 15 is further mentioned. When the handle is actuated, motion would otherwise be transmitted thru the brake rigging even to the far end of the car. The hanger 15 acts as a definite stop means which arrests the transmission of this movement and thereby prevents a disturbance of the angularity of the truck levers at the opposite end of the car. In other words, an actuating or regulating movement of the operating handle 25 without the provision of the hanger 15 or equivalent means would result in the levers at both ends of the car becoming distorted. In the absence of stop means as described, repeated operations of the regulator would soon throw the levers out of their normal position to such an extent as to cause dragging brake shoes due to unequal angularity and regulation.

In Fig. 3 there is shown a modification of the lever supporting means. The general relation of the bolster 5 and lug 18 and hanger or housing for the upper end of the dead lever 7 is substantially the same as that above described, but in this instance, the hanger 17 is provided with a plurality of staggered holes 27, instead of slot 16', for receiving the pin 22 passing thru dead lever 7. When this mechanism is desired to be actuated to regulate the brake shoes, the handle 25 is moved towards the left as before until the right end of slot 23 engages the pin 24 in lug 18. To permit further movement, the pin 22 is removed and a roller 30, provided on lever 7, rolls freely along the under side of the hanger 17 and holds the same in position so that excess travel is taken up by reinserting pin 22 thru the next adjacent hole 27 and securing it in place as by a cotter pin. The staggered arrangement of the holes 27 permits of close adjustment for taking up of excess travel. On first application of the brakes, the hanger 17 will slide back on pin 24 towards the right the full distance of the slot 23, thus insuring proper brake shoe clearance for brake operation.

Considering now the further modification shown in Figs. 4 and 5, the hanger 17, having the clearance slot 23 and straddling the lug 18 as in the forms above described, is provided with a slot 30 in which is arranged an inverted ratchet 31. The pin 22 extending thru dead lever 7 engages the ratchet 31, the weight of the hanger 17 holding the parts securely locked at all times. When it is desired to adjust the brakes, the handle 25 is pulled to the left, and the hanger 17 moves to the left the length of the clearance slot 23. If any excess slack is present in the rigging, the pin 22 moves over one or more teeth of ratchet 31, and the lever 7 is fulcrumed in adjusted position. To release the apparatus as when inserting new brake shoes, the hanger 17 is raised to disengage the pin 22 from the ratchet, and the parts are permitted to drop back to their initial positions.

From the above, it will be seen that the present invention contemplates among other features the provision of a simple and practical manually actuated regulator for determining proper brake shoe clearance on all of the brake shoes of a truck in a single operation without in any way disturbing the angularity of the truck levers at the opposite end of the car. The invention is further believed to accomplish among others all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a regulator for foundation brake rigging, including brake levers and limiting stop means therefor, in combination, a truck bolster having supporting means thereon, a lever fulcrum having a lost motion connection with said supporting means and having a ratchet surface, and a pawl at one end of one of the brake levers in operative engagement with said ratchet and adapted to move relatively to said fulcrum when regulation of the brakes involving movement in excess of that permitted by the lost motion connection takes place.

2. In a regulator for foundation brake rigging including brake levers and limiting stop means therefor, in combination, a truck bolster having supporting means thereon, a dead lever supporting member having a lost motion connection with said supporting means proportional to full brake shoe clearance thereby to permit a free movement proportional to brake shoe clearance as determined by said connection, a lever supported from said member, and means to change the relative point of connection between said lever and member when regulating movement of the brakes in excess of the lost motion connection takes place.

3. In a regulator for foundation brake rigging including brake levers and limiting stop means therefor, in combination, a truck bolster, a lug mounted thereon, a lever fulcrum mounted from said lug and permitted free movement relative thereto proportional to full brake shoe clearance prior to a regulating take up movement, a dead lever operatively connected to said fulcrum, and means to change the relative point of connection therebetween when the lever is actuated an amount exceeding brake shoe clearance.

4. In a regulator for foundation brake rigging including brake levers and limiting stop means therefor, in combination, a truck bolster, a lug mounted thereon, a dead lever fulcrum having a slotted connection with said lug and permitted a free movement relative thereto as defined by said slot, a dead lever operatively connected with said fulcrum, an operating rod extending from said lever, and means to change the relative point of connection between said fulcrum and lever upon actuation of said lever by said rod a distance in excess of the movement permitted by said slotted connection.

5. In a regulator for foundation brake rigging including brake levers and limiting stop means therefor, in combination, a truck bolster, a lug mounted thereon and provided with a lost motion pin, a lever fulcrum having a slot therein proportional to full brake shoe clearance and thru which said pin passes thereby to permit a free movement therebetween as defined by said slot, a dead lever operatively connected with said fulcrum, an operating rod extending from said lever, means to change the relative point of connection between said fulcrum and lever upon actuation of said lever by said rod a distance in excess of the movement permitted by said slotted connection, and a roller carried by said lever and adapted to engage said fulcrum during relative movement therebetween.

6. In a regulator for foundation brake rigging, in combination, a truck bolster having supporting means thereon, a lever fulcrum having a lost motion connection with said supporting means and having a ratchet surface, and a pawl at one end of one of the brake levers in operative engagement with said ratchet and adapted to move relatively to said fulcrum when regulation of the brakes involving movement in excess of that permitted by the lost motion connection takes place.

7. In a regulator for foundation brake rigging, in combination, a truck bolster having supporting means thereon, a dead lever supporting member having a lost motion connection with said supporting means proportional to full brake shoe clearance thereby to have a free movement proportional to brake shoe clearance as determined by said connection, a lever supported from said member, and means to change the relative point of connection between said lever and member when regulating movement of the brakes in excess of the lost motion connection takes place.

8. In a regulator for foundation brake rigging, in combination, a truck bolster, a lug mounted thereon, a lever fulcrum mounted from said lug and permitted free movement relatively thereto proportional to full brake shoe clearance prior to a regulating take up movement, a dead lever operatively connected to said fulcrum, and means to change the relative point of connection therebetween when the lever is actuated an amount exceeding brake shoe clearance.

9. In a regulator for foundation brake rigging, in combination, a truck bolster, a lug mounted thereon, a dead lever fulcrum having a slotted connection with said lug and permitted a free movement relative thereto as defined by said slot, a dead lever operatively connected with said fulcrum, an operating rod extending from said lever, and means to change the relative point of connection between said fulcrum and lever upon actuation of said lever by said rod a distance in excess of the movement permitted by said slotted connection.

10. In a regulator for foundation brake rigging, in combination, a truck bolster, a lug mounted thereon and provided with a lost motion pin, a lever fulcrum having a slot therein proportional to full brake shoe clearance and thru which said pin passes thereby to permit a free movement therebetween as defined by said slot, a dead lever operatively connected with said fulcrum, an operating rod extending from said lever, means to change the relative point of connection between said fulcrum and lever upon actuation of said lever by said rod a distance in excess of the movement permitted by said slotted connection, and a roller carried by said lever and adapted to engage said fulcrum during relative movement therebetween.

11. In a regulator for foundation brake rigging, in combination, a truck bolster, a supporting means thereon, a lever fulcrum having a slot therein of a length proportional to brake shoe clearance, a pin extending from said supporting means and passing thru said slot thereby permitting relative movement between said supporting means and fulcrum as defined by said slot, a ratchet on said fulcrum, a lever operatively connected to said fulcrum, and means operative between said lever and said ratchet to change the relative point of connection between said fulcrum and lever upon actuation of the lever in excess of movement proportional to brake shoe clearance.

Signed at New York, New York, this 11th day of October, 1927.

WILLIAM H. SAUVAGE.